Feb. 26, 1963 J. M. SLATER ETAL 3,078,727
REVERSING GYROSCOPE
Filed April 12, 1952 4 Sheets-Sheet 1

INVENTORS
JOHN M. SLATER
WILLIAM M. SCARBOROUGH
JOSEPH C. BOLTINGHOUSE
BY DARWIN L. FREEBAIRN, JR.

William P. Lane
ATTORNEY

Feb. 26, 1963 J. M. SLATER ETAL 3,078,727
REVERSING GYROSCOPE
Filed April 12, 1952 4 Sheets-Sheet 2

*INVENTORS*
JOHN M. SLATER
WILLIAM M. SCARBOROUGH
JOSEPH C. BOLTINGHOUSE
BY DARWIN L. FREEBAIRN, JR.

*William L. Lane*
ATTORNEY

Feb. 26, 1963 J. M. SLATER ETAL 3,078,727
REVERSING GYROSCOPE
Filed April 12, 1952 4 Sheets-Sheet 3

INVENTORS
JOHN M. SLATER
WILLIAM M. SCARBOROUGH
JOSEPH C. BOLTINGHOUSE
DARWIN L. FREEBAIRN, JR.
BY
William L. Lane
ATTORNEY

United States Patent Office 3,078,727
Patented Feb. 26, 1963

3,078,727
REVERSING GYROSCOPE
John M. Slater, Fullerton, William M. Scarborough, Whittier, Joseph C. Boltinghouse, Los Angeles, and Darwin L. Freebairn, Jr., Sunset Beach, Calif., assignors to North American Aviation, Inc.
Filed Apr. 12, 1952, Ser. No. 282,058
18 Claims. (Cl. 74—5)

This invention concerns a single degree of freedom electrically-driven gyroscope, and in particular a gyroscope which is especially designed for use in gyroscopic apparatus of the type disclosed in patent application Serial No. 200,234 filed December 11, 1950, in the names of Darwin L. Freebairn and John M. Slater, for "Self-Compensating Gyro Apparatus."

The requirements of a self-compensating gyro apparatus as applied to missile guidance are very complex. Normal guidance gyroscope configurations of three gyroscopes are not adequate to satisfy the self-compensating gyro apparatus. Six gyroscopes are needed for the self-compensating gyro apparatus—two upon each axis. For best operation of a self-compensating gyro apparatus the acceleration field surrounding the gyroscopes should be approximately the same during the entire reversing cycle. Certain missile applications of a self-compensating gyro apparatus require that the orientation of the rotor axis of each pair of gyroscopes be turned relative to the acceleration of gravity in accordance with earth rotation and missile movement. The change in orientation of the rotor axis of each gyroscope relative to the acceleration of gravity could conceivably be of the order of 45 degrees per hour or more. In order to keep surrounding acceleration fields approximately the same during the entire reversing cycle of the gyroscopes, it is necessary to make the reversing cycle very short. Certain types of disturbances of the autonavigator, of which the gyroscope assembly forms a part, will cause the autonavigator to oscillate by pendulum action with a period of approximately 84 minutes. The period of reversal of the gyroscopes in the self-compensating gyro apparatus must be a small fraction of the 84-minute period to avoid exciting this natural oscillation frequency of the autonavigator. A reversal time of the order of five minutes is small enough to satisfy the requirements of the self-compensating gyro apparatus and to achieve effective compensation. Because of space limitations in a missile the six required gyroscopes must be nested in as compact a configuration as possible. Power devices nested in a compact configuration introduce problems of heat dissipation which may be very serious with gyroscopes because of mass shift due to thermal instability.

Standard precision guidance gyroscopes have serious disadvantages when used in a self-compensating gyro apparatus for missile purposes. The size of standard gyroscopes is prohibitively large. Standard gyroscopes are designed primarily for optimum gyroscopic efficiency without regard for optimum packaging considerations. In order to reverse a standard gyroscope which has a very high moment of inertia it is necessary to use an excessive amount of power with a corresponding temperature rise. To require standard gyroscopes to reverse in a period of the order of five minutes would not only cause serious temperature instability but would mechanically damage the gyroscope.

The gyroscope of this invention was designed to have a moment of inertia sufficient to obtain the accuracy required for the self-compensating gyro apparatus and still be small enough to allow rapid reversals without greatly increasing the power consumption of the gyroscope (during the reversal period) above its average power consumption. The gyroscope of this invention has remarkable temperature stability as a result of its approximately constant power consumption. The gyroscope reverses within the required five minute period with ease. The gyroscope is conically shaped to save space and to fit compactly within a sphere in combination with five other properly oriented gyroscopes. The radius of the sphere is adjusted to the gyroscope. The gyroscope is of a minimum size consistent with the exposure of an adequate surface area to allow rapid heat dissipation.

It is therefore an object of this invention to provide a gyroscope with optimum characteristics for use in the gyro apparatus disclosed in patent application Serial No. 200,234 filed December 11, 1950, in the names of Darwin L. Freebairn and John M. Slater, for "Self-Compensating Gyro Apparatus."

It is another object of this invention to provide a gyroscope capable of repeated rapid reversals.

It is another object of this invention to provide a compact gyroscope configuration of three, four, or six gyroscopes.

It is another object of this invention to provide a gyroscope with a high ratio of surface area-to-mass.

It is another object of this invention to provide a gyroscope whose moment of inertia and motor characteristics are such that reversals may be accomplished without greatly increasing the instantaneous power consumption above the average power consumption of the gyroscope.

It is another object of this invention to provide a gyroscope which may be arranged in a configuration which avoids error torques due to thermal unbalance about the output axis of said gyroscope.

It is another object of this invention to provide a gyroscope with the precession or output axis constrained by low friction bearings.

It is another object of this invention to provide a gyroscope with the precession or output axis constrained by flexure pivots.

It is another object of this invention to provide a miniature flotation gyroscope with a conically-shaped rotor, a spherically-shaped rotor support, a conically-shaped rotor housing, low friction output axis bearings, and a conically-shaped housing for use as a reversing gyroscope.

It is another object of this invention to provide a gyroscope with a conically-shaped rotor housing which is constrained by low friction bearings mounted in re-entrant cavities at either end of the rotor housing about its precession or output axis.

It is another object of this invention to provide an electrically driven gyroscope whose rotor comprises two identical frustums of right circular cones rigidly attached together at the small end of the frustums.

Other objects of invention will become apparent from the following description taken in connection with the accompanying drawings, in which FIG. 1 is a view of six reversing gyroscopes assembled in a typical self-compensating gyro apparatus configuration;

Figure 1:
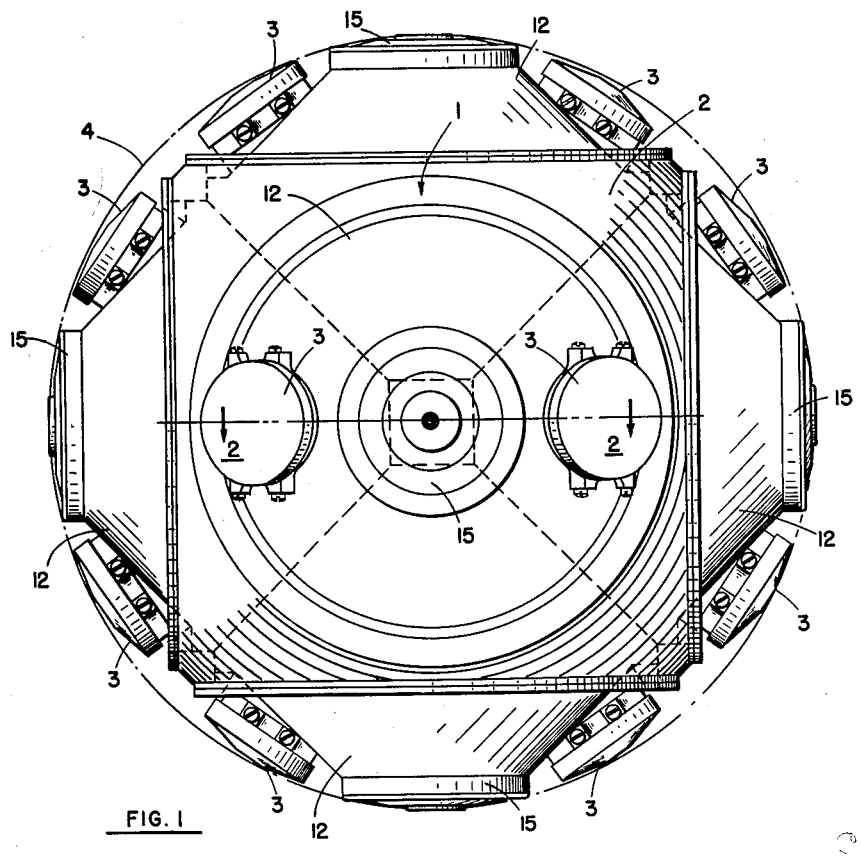

In FIG 1 six gyroscopes are assembled in a compact assembly within frame 2. Only five gyroscopes may be seen. The sixth gyroscope is directly in back of and has its precession axis coaxial with the precession axis of gyroscope 1 which is shown in plan view. The gyroscopes, frame 2 and housing 3 all fit within a sphere represented by circle 4. The precession axis of each gyroscope lies upon a radius of the sphere represented by circle 4. The temperature gradient from the center of the sphere represented by circle 4 to the outside of the sphere is everywhere in a radial direction because of the symmetry of the entire gyroscope assembly.

Figure 2:
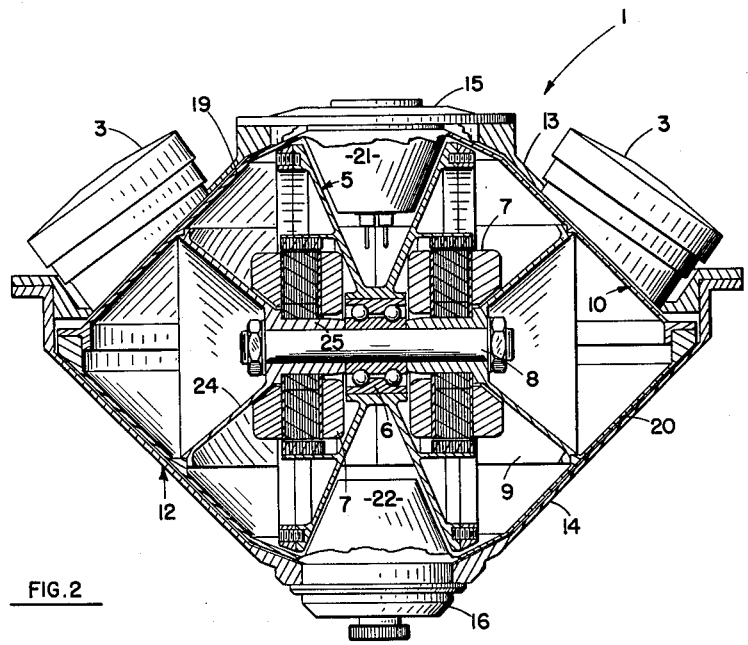
FIG. 2 is a sectional view taken at 2—2 in FIG. 1 of a reversing gyroscope, with certain elements in elevation.
Figure 10:
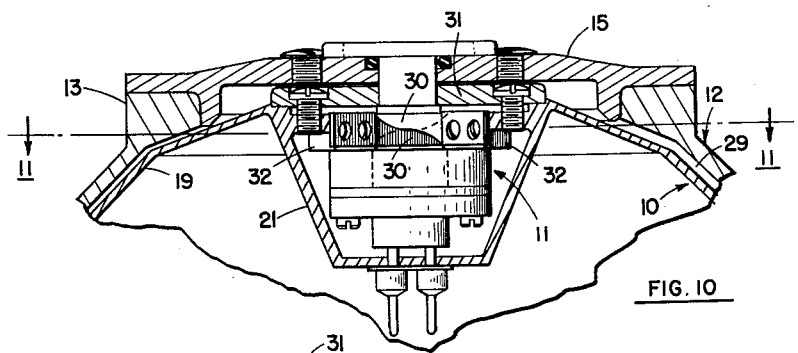
FIG. 10 is a profile view of a flexure pivot assembly with a partial section view of the rotor housing and the gyroscope housing.

In FIG. 2 may be seen an assembled gyroscope 1 in section with certain elements in elevation. Gyroscope 1 is comprised of a rotor 5 turning upon a bearing assembly 6 and driven by motor means 7. Bearing assembly 6 is supported upon the center of shaft 8. Shaft 8 is supported by rotor support 9 which fits snugly within rotor housing 10. Rotor housing 10 is supported on low friction bearing assembly 11, one embodiment of which is shown in FIG. 10. Low friction bearing 11 is mounted upon gyroscope housing 12.

Figure 8:
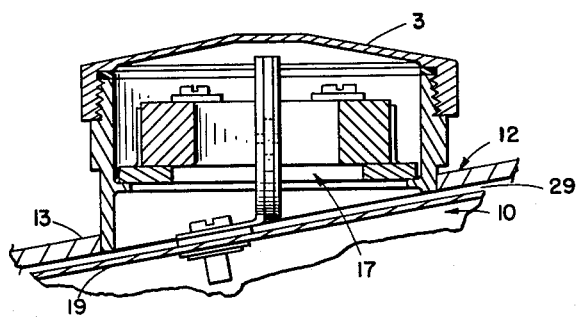
FIG. 8 is a section view of the magnetic torquer and torquer housing with the movable coil in profile.
Figure 9:
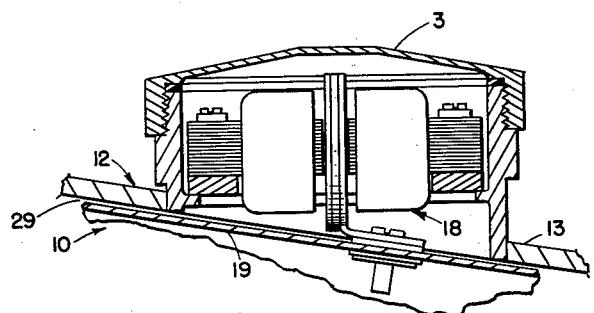
FIG. 9 is a section view of the electromagnetic pickoff and pickoff housing with the movable coil in profile.

Gyroscope housing 12 comprises two frustums of identical right circular cones 13 and 14 rigidly attached and sealed at the larger end. The smaller end of each frustum 13 and 14 is attached and sealed to plates 15 and 16. Top frustum 13 has two housings 3 rigidly attached to it. Housing 3 are for the purpose of accommodating torquer assembly 17 as shown more particularly in FIG. 8, and pickoff assembly 18 as shown more particularly in FIG. 9.

Figure 4:
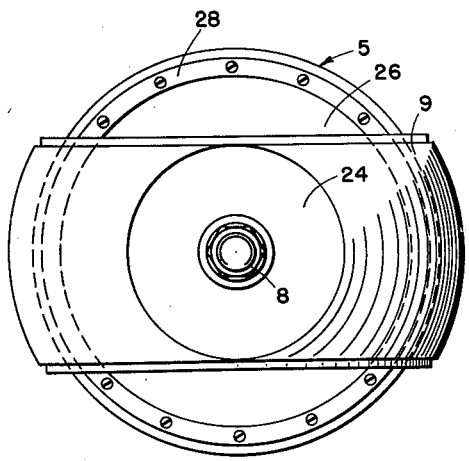
FIG. 4 is a side view of the rotor and rotor support as viewed from the left in FIG. 3.
Figure 3:
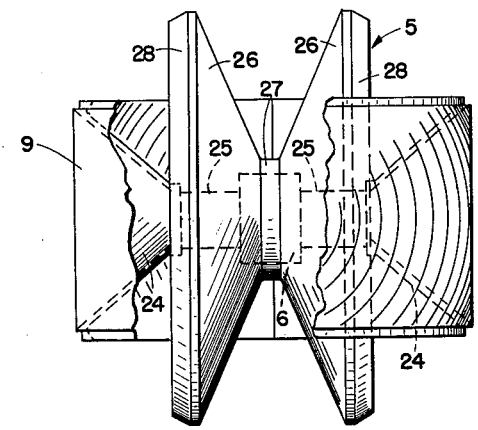
FIG. 3 is a side view of the rotor and rotor support with a portion of the rotor support broken away.
Figure 5:
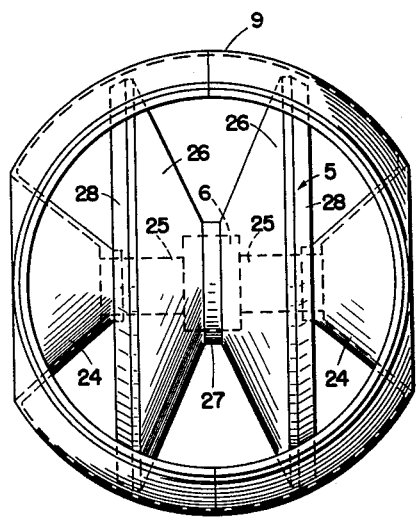
FIG. 5 is a top plan view of the rotor and rotor support.
Figure 6:
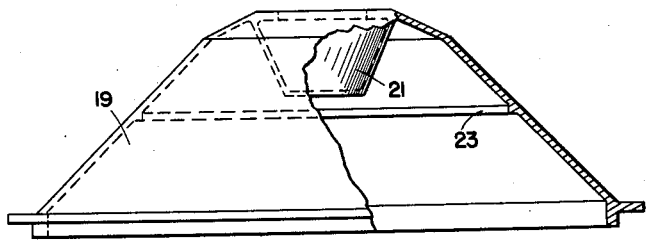
FIG. 6 is a side view of the top portion of the rotor housing, partly in section.
Figure 7:
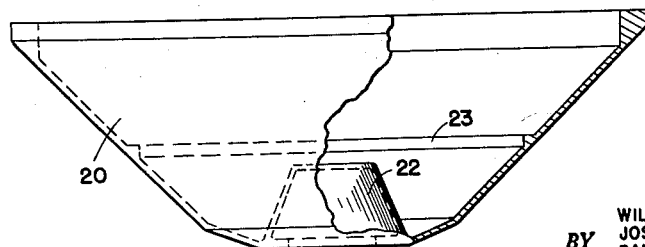
FIG. 7 is a side view of the bottom portion of the rotor housing, partly in section.

Rotor housing 10 is shown more particularly in FIGS. 6 and 7. As shown in FIGS. 6 and 7 rotor housing 10 comprises two frustums of identical right circular cones 19 and 20 rigidly attached at the larger ends. The smaller ends of frustums 19 and 20 are re-entrant. Re-entrant portions 21 and 22 are each in the shape of a frustum of a right circular cone with the smaller end facing inward. Re-entrant portions 21 and 22 surround low friction bearing assemblies 11. About the interior of each frustum 19 and 20 is a shoulder which mates with the corresponding shoulder upon rotor support 9. Rotor support 9 assembled together with rotor 5 is shown in FIGS. 3, 4 and 5. Rotor support 9 is a segment of a sphere and nests against shoulder 23 upon rotor housing 10. Rotor support 9 is symmetrical about a central plane of its sphere. Rotor support 9 is re-entrant along the axis of rotor 5. Re-entrant portions 24 are each in the shape of a frustum of a right circular cone with the smaller end facing inward. A tubular portion 25 is attached to the smaller end of each frustum 24. Each tubular portion 25 is coaxial with the axis of rotor 5 and is used to support shaft 8.

Figure 11:
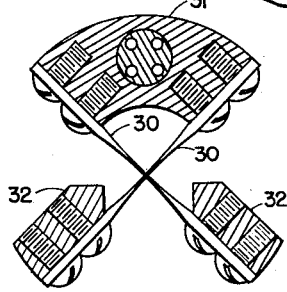
FIG. 11 is a view of the flexure springs and spring supports, partly in section, taken at 11—11 in FIG. 10.

Rotor 5 comprises two identical frustums 26 of right circular cones rigidly attached at their smaller ends by cylindrical portion 27. Weights 28 are attached to the periphery of each frustum 26 to obtain the proper moment of inertia for rotor 5. Low friction bearing 11 may be a flexure pivot bearing as shown in FIGS. 10 and 11. A flotation fluid may or may not be inserted into the space 29 between gyroscope housing 12 and rotor housing 10. In FIGS. 10 and 11 one end of each crossed flexure spring 30 is attached to gyroscope housing 12 while the other end of each spring 30 is attached to rotor housing 10. Electric wiring is carried across flexure springs 30 by means of crossed, crinkled wires (not shown). Spring support 31 and spring supports 32 are attached to rotor housing 10.

In the preferred embodiment of this invention all parts fit together by means of the mating of cylindrical flanges. The parts are fastened together to prevent movement and a corresponding mass shift.

The self-compensating gyro apparatus requires two gyroscopes for each axis about which stabilization is to be accomplished, or a total of six gyroscopes. A conventional stabilization scheme such as that shown in patent application Serial No. 86,424 filed April 9, 1949, in the names of R. B. Horsfall, Jr., John M. Slater and J. A. Widemann, on the other hand requires but one gyroscope for each axis, or a total of three gyroscopes. Conventional guidance gyroscopes would prove very large and bulky if adapted to the six gyroscope configuration. In addition, conventional guidance gyroscopes would not be able to reverse rapidly enough to satisfy the requirements of a self-compensating gyro apparatus applied to the guidance of a free missile. Rapid reversals of conventional guidance gyroscopes would overheat and mechanically damage them.

The conical shape of gyroscope of this invention peculiarly adapts it to fit compactly into a minimum of space when used in a shelf-compensating gyro apparatus. As shown in FIG. 1 the six gyroscopes fit compactly into a sphere with a minimum of wasted space. Each of the gyroscopes has its output axis along a radius of the sphere. Because of the symmetry of the gyroscope configuration in which the gyroscope of this invention fits, the temperature gradient is also everywhere along a radius of the sphere. Thus, there is no mass shift due to thermal effects. The moment of inertia of the gyroscope of this invention is made low compared to that of conventional guidance gyroscopes in order to prevent mechanical damage when torque is applied to reverse the direction of the rotor and to keep the power input to the gyroscope during the reversal period approximately the same as the average power input. The thermal stability of the gyroscope is further enhanced by the approximately constant input power. The gyroscope is of a minimum size consistent with the exposure of an adequate surface area to allow rapid heat dissipation.

In a typical example of the apparatus made according to the invention, a gyroscope having an angular momentum of 2.7 million gram-centimeter-squared-per-second at 200 revolutions-per-second is reversed from plus to minus 200 revolutions-per second in less than one minute, while the average temperature rise is only one degree centigrade, due to the combination of the features described.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A gyroscope comprising a gyroscope housing in the general shape of two frustums of identical right circular cones fastened together at the large end of said frustums and having their axis of symmetry upon the output axis of said gyroscope, a rotor housing conically shaped to fit inside said gyroscope housing, low friction bearings connected between said rotor housing and said gyroscope housing for supporting said rotor housing upon the output axis of said gyroscope, a rotor in the shape of two frustums of right circular cones rigidly connected together at the small end of said frustums, a rotor support for connecting said rotor and said rotor housing, said rotor being rotatably attached to the center of said rotor support, said rotor support being of the general shape of a spherical segment symmetrical about a plane passing through the axis of said rotor and perpendicular to said output axis to fit within said conical rotor housing.

2. A gyroscope having a moment of inertia sufficient to obtain accuracy while still being small enough to allow rapid reversals of the rotor of said gyroscope without greatly increasing the power consumption of said gyroscope during said reversals above its average power consumption, comprising a gyroscope housing in the general shape of two frustums of right circular cones rigidly attached at their larger ends, a rotor housing conically shaped to fit within said gyroscope housing, low friction bearings connected between said housing, said rotor housing being mounted upon said bearings so that it is free to rotate about the output axis of said gyroscope over a small angle relative to said gyroscope housing, said rotor housing having re-entrant portions symmetrical about the output axis of said gyroscope for compactly housing said low friction bearings, a rotor having the general shape of two frustums of right circular cones rigidly attached at the small end of said frustums, said rotor being conically shaped to clear said re-entrant portions, a rotor support for supporting said rotor relative to said rotor housing, said rotor support having a portion of the general shape of a spherical segment symmetrical about a plane passing through the axis of said rotor and perpendicular to said output axis whereby a gyroscope is obtained having very high temperature stability, and a short reversing period.

3. A device as recited in claim 2 wherein said low friction bearings comprise two crossed flexure springs, one end of each of said flexure springs being rigidly attached to said gyroscope housing, the other end of each of said flexure springs being attached to said rotor housing whereby a gyroscope is obtained which has zero friction upon its output axis.

4. A device as recited in claim 2 having electromagnetic detection means for detecting movement about said output axis.

5. A device as recited in claim 2 having magnetic force means for applying a torque about an axis perpendicular to the plane of the axis of said rotor and said gyroscope output axis.

6. A gyroscope comprising a gyroscope housing in the general shape of two frustums of identical right circular cones fastened together at the large end of said frustums and having their axis of symmetry upon the output axis of said gyroscope, a rotor housing conically shaped to fit inside said gyroscope housing, bearings including fluid between said gyroscope housing and said rotor housing for supporting said rotor housing upon the output axis of said gyroscope, a rotor in the shape of two frustums of right circular cones rigidly connected together at the small end of said frustums, a rotor support for connecting said rotor and said rotor housing, said rotor being rotatably attached to the center of said rotor support, said rotor support being of the general shape of a spherical segment symmetrical about a plane passing through the axis of said rotor to fit within said conical rotor housing.

7. A device as recited in claim 6 having electromagnetic detecting means connected to detect movement about said output axis.

8. A device as recited in claim 6 having magnetic force means connected to apply a torque to said rotor housing.

9. A gyroscope comprising a gyroscope housing in the general shape of two frustums of identical right circular cones fastened together at the large end of said frustums and having their axis of symmetry upon the output axis of said gyroscope, a rotor housing conically shaped to fit inside said gyroscope housing, flexure springs connected to said rotor housing for supporting said rotor housing upon the output axis of said gyroscope, a rotor in the shape of two frustums of right circular cones rigidly connected together at the small end of said frustums, a rotor support for connecting said rotor and rotor housing, said rotor being rotatably attached to the center of said rotor support, said rotor support being of the general shape of a spherical segment symmetrical about a plane passing through the axis of said rotor to fit within said rotor housing.

10. A device as recited in claim 9 having electromagnetic detecting means connected to detect movement about said output axis.

11. A device as recited in claim 9 having magnetic force means connected to apply a torque to said rotor housing.

12. A gyroscope having a moment of inertia sufficient to obtain accuracy while still being small enough to allow rapid reversals of the rotor of said gyroscope without greatly increasing the power consumption of said gyroscope, during said reversals, above its average power consumption, comprising a gyroscope housing in the general shape of two frustums of right circular cones rigidly attached at their larger ends, a rotor housing conically shaped to fit within said gyroscope housing, bearings including fluid between said gyroscope housing and said rotor housing, said rotor housing being mounted upon said bearings so that it is free to rotate about the output axis of said gyroscope relative to said gyroscope housing, a rotor having the general shape of two frustums of right circular cones rigidly attached at the small end of said frustums, a rotor support for supporting said rotor relative to said rotor housing, said rotor support having a portion of the general shape of a spherical segment symmetrical about a plane passing through the axis of said rotor and perpendicular to said output axis whereby a gyroscope is obtained having very high temperature stability, and a short reversing period.

13. A device as recited in claim 12 having electromagnetic detecting means connected to detect movement about said output axis.

14. A device as recited in claim 12 having magnetic force means connected to apply a torque to said rotor housing.

15. A gyroscope having a moment of inertia sufficient to obtain accuracy while still being small enough to allow rapid reversals of the rotor of said gyroscope without greatly increasing the power consumption of said gyroscope, during said reversals, above its average power consumption, comprising a gyroscope housing in the general shape of two frustums of right circular cones rigidly attached at their larger ends, a rotor housing conically shaped to fit within said gyroscope housing, flexure springs connected between said housing, said rotor housing being mounted upon said springs so that it is free to rotate about the output axis of said gyroscope over a small angle relative to said gyroscope housing, said rotor housing having reentrant portions symmetrical about the output axis of said gyroscope for compactly housing said flexure springs, a rotor having the general shape of two frustums of right circular cones rigidly attached at the small end of said frustums, said rotor being conically shaped to clear said reentrant portions, a rotor support for supporting said rotor relative to said rotor housing, said rotor support having a portion of the general shape of a spherical segment symmetrical about a plane passing through the axis of said rotor and perpendicular to said output axis whereby a gyroscope is obtained having very high temperature stability, and a short reversing period.

16. A device as recited in claim 15 having electromagnetic detecting means connected to detect movement about said output axis.

17. A device as recited in claim 15 having magnetic force means connected to apply a torque to said rotor housing.

18. A gyroscope assembly comprising six gyroscopes, each of said gyroscopes comprising a gyroscope housing in the general shape of two frustums of identical right circular cones fastened together at the large end of said frustums and having their axis of symmetry upon the output axis of said gyroscope, a rotor housing conically shaped to fit inside said gyroscope housing, low friction bearings connected between said rotor housing and said gyroscope housing for supporting said rotor housing upon the output axis of said gyroscope, a rotor in the shape of two frustums of right circular cones rigidly connected together at the small end of said frustums, a rotor support for connecting said rotor and said rotor housing, said rotor being rotatably attached to the center of said rotor support, said rotor support being of the general shape of a spherical segment symmetrical about a plane passing through the axis of said rotor, said gyroscope assembly having three mutually perpendicular axes, the output axis of the first and second said gyroscopes being coaxial with the first said mutually perpendicular axis, the output axis of the third and fourth said gyroscopes being coaxial with the second said mutually perpendicular axis, the output axis of the fifth and sixth said gyroscopes being coaxial with the third said mutually perpendicular axis; a frame, said frame supporting said gyroscopes with said orientation of said output axes, whereby said gyroscopes fit compactly within a sphere with the temperature gradient everywhere in a direction radial to said sphere.

References Cited in the file of this patent

UNITED STATES PATENTS

| | | |
|---|---|---|
| 807,195 | Noalhat et al. | Dec. 12, 1905 |
| 865,278 | Stannard | Sept. 3, 1907 |
| 1,265,899 | Forster | May 14, 1918 |
| 1,501,886 | Abbott | July 15, 1924 |
| 1,558,721 | Thompson | Oct. 27, 1925 |
| 1,794,749 | Zelov | Mar. 3, 1931 |
| 2,109,283 | Boykow | Feb. 22, 1938 |
| 2,361,741 | Bonsky | Oct. 31, 1944 |
| 2,606,447 | Boltinghouse | Aug. 12, 1952 |
| 2,641,132 | Barkalow | June 9, 1953 |